Dec. 26, 1967   A. M. FOOTE   3,359,846
PIANO INSTRUCTION AID
Filed Oct. 18, 1963   4 Sheets-Sheet 1
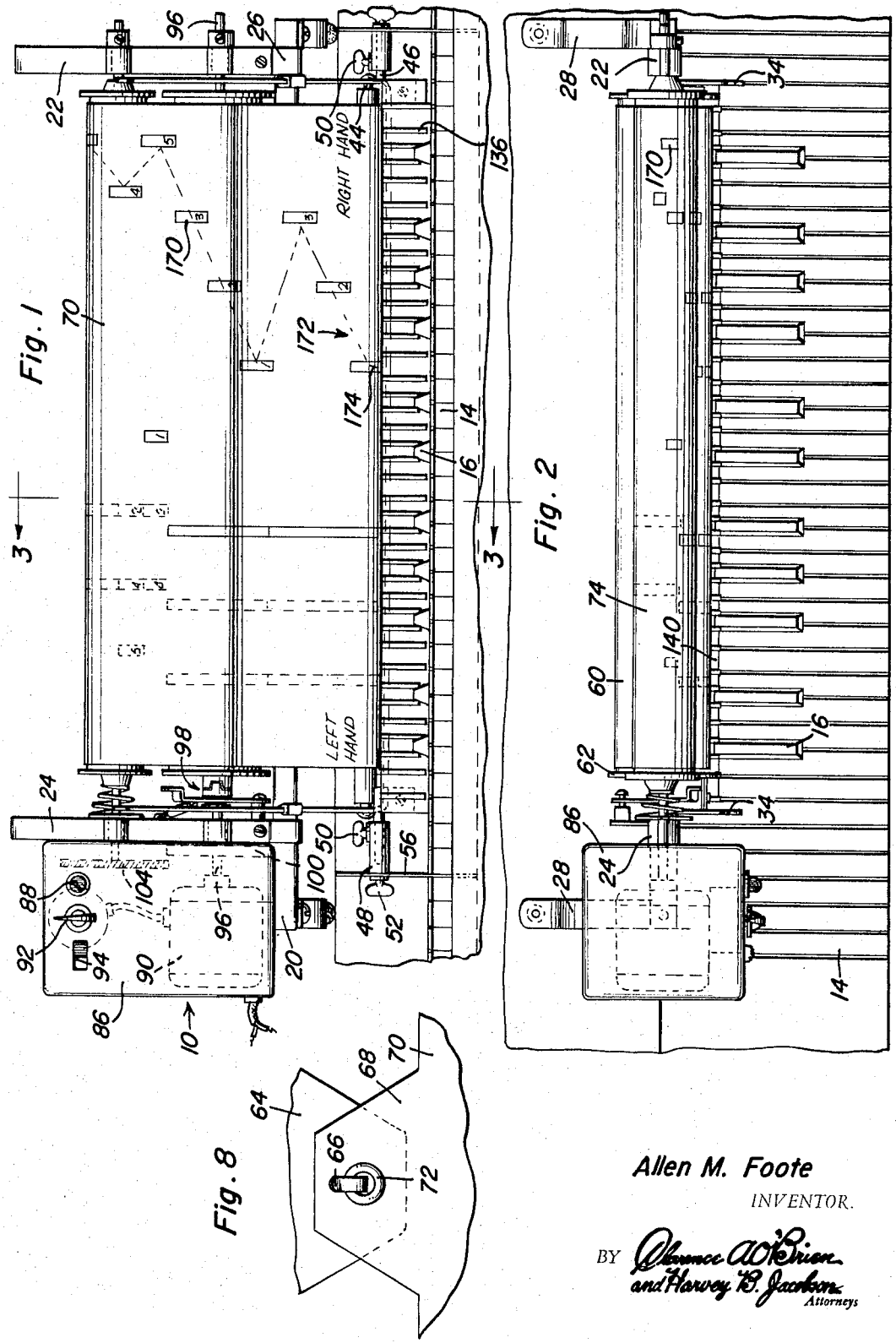
Allen M. Foote
INVENTOR.
BY Clarence A. O'Brien
and Harvey B. Jacobson
Attorneys Dec. 26, 1967 A. M. FOOTE 3,359,846
PIANO INSTRUCTION AID
Filed Oct. 18, 1963 4 Sheets-Sheet 2

Allen M. Foote
INVENTOR.

BY Clarence A. O'Brien
and Harvey B. Jackson
Attorneys

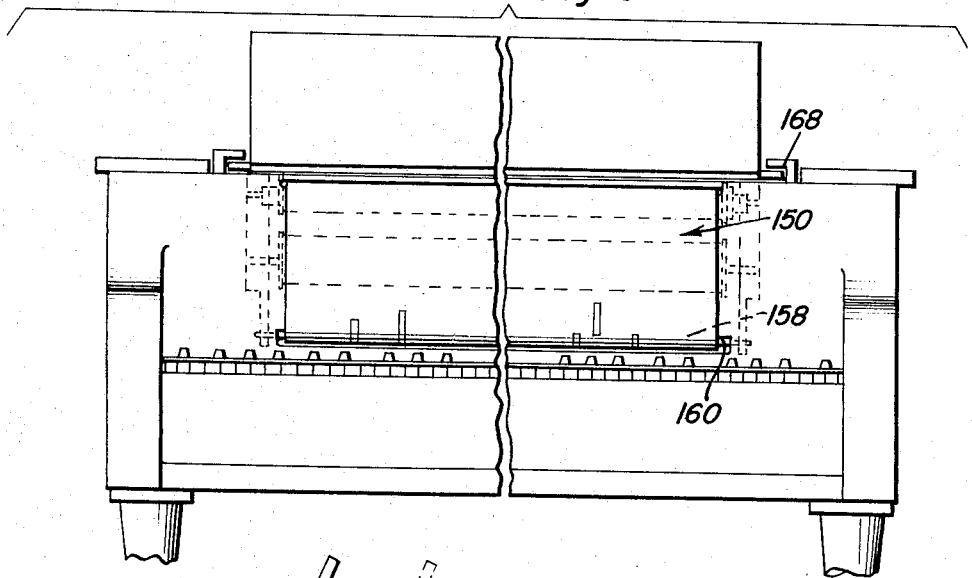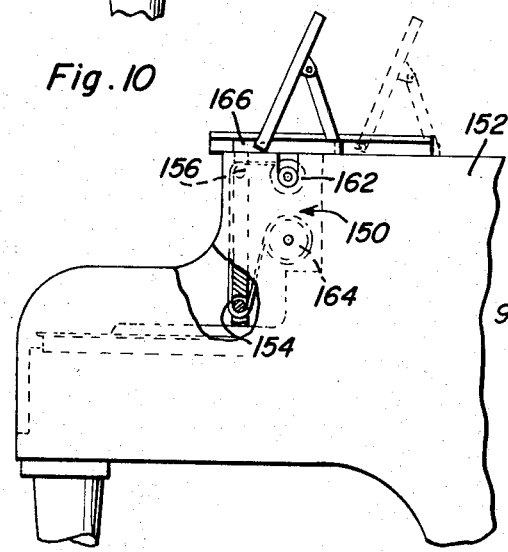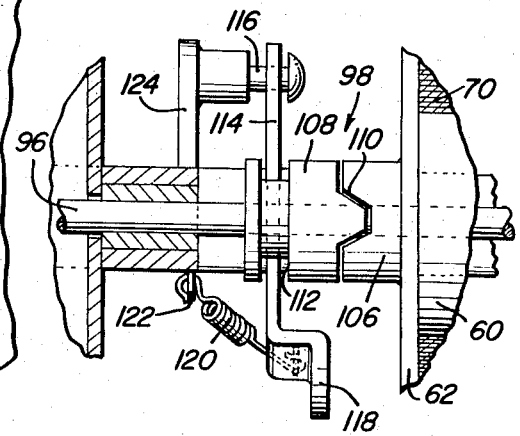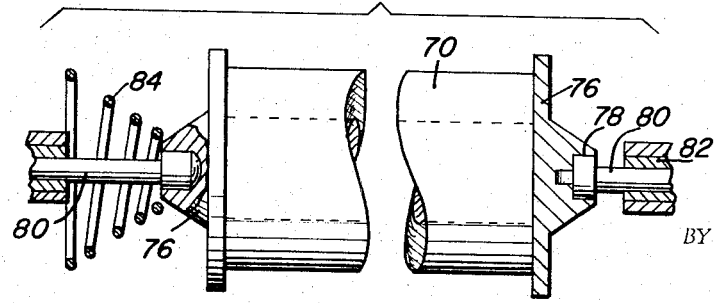

Dec. 26, 1967  A. M. FOOTE  3,359,846
PIANO INSTRUCTION AID
Filed Oct. 18, 1963  4 Sheets-Sheet 4

Allen M. Foote
INVENTOR.

BY
Attorneys

United States Patent Office 3,359,846
Patented Dec. 26, 1967

3,359,846
PIANO INSTRUCTION AID
Allen M. Foote, % Dampp-Chaser Inc., P.O. Box 1641, Hendersonville, N.C. 28739
Filed Oct. 18, 1963, Ser. No. 317,169
11 Claims. (Cl. 84—478)

The present invention generally relates to an instruction aid and more particularly to an instruction aid used in combination with keyboard musical instruments such as a piano, organ or the like or with other instruments requiring particular arrangements of the fingers such as fretted instruments.

An object of the present invention is to provide an instruction aid for pianos or the like and includes a web of paper having instructional material thereon which is movable to reveal the instructional indicia and orientated in a position directly above the keyboard so that the person using the instruction aid of the present invention will not have to move his eyes from the area of the music rack to the keys thereby facilitating the viewing of the instructional indicia on the paper web.

Another object of the present invention is to provide an instruction aid for keyboard instruments in which distinguishable marks are placed on the paper and orientated in such a manner that they move downwardly towards the keys of the keyboard and serve to indicate which key is to be depressed and also the indicia will indicate which finger of which hand is to be employed to depress the particular key.

A further object of the present invention is to provide an instruction aid in accordance with the preceding objects in which the paper web is mounted on a supply spool and is wound onto a take-up spool by a variable speed drive motor thereby enabling the speed of movemnt of the paper web to be started, stopped or varied for changing the tempo of the music being played in accordance with the musical arrangement or for practicing and training.

Yet another object of the present invention is to provide an instruction aid for use in combination with pianos, organs or the like which may be easily supported on an existing instrument without modification thereof and with very little difficulty or may be built into pianos or the like as they are constructed with the instruction aid being substantially concealed when built in.

Still another important object of the present invention is to provide an instruction aid having a paper web movable to a position adjacent the upper surface of the black keys together with a transition strip having distinguishable areas extending from the surface of the paper web directly to the surface of the black and white keys and having divisional lines thereon corresponding with the lines between the keys thereby enabling the indicia to be readily associated with a particular key regardless of the angle from which the instructional indicia and key is viewed thereby facilitating the accuracy enjoyed when using the present invention and eliminating parallax.

A further important object of the present invention is to provide an arrangement in accordance with the preceding object in which the transition strip may have movable shutters thereon resting on the top surface of the keys which will move downwardly therewith for revealing indicia on the transition strip for indicating certain information related to the key that was depressed.

Another feature of the invention is to provide an aid adapted to be mounted on a music stand.

Other objects of the present invention will reside in its simplicity of construction, effectiveness in operation and relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front view of the instruction aid of the present invention illustrating its orientation and relation to a keyboard instrument such as a piano or the like;

FIGURE 2 is a top plan view of the construction of FIGURE 1 illustrating further relationship between the instruction and the keyboard;

FIGURE 6 is a detailed fragmentary view illustrating the drive clutch for the take-up roll;

FIGURE 7 is a fragmentary view illustrating the construction of the mechanism for holding the supply roll removably in place;

FIGURE 8 is a fragmentary view illustrating the manner in which the leader on the take-up roll is connected with the paper web on the supply roll;

FIGURE 9 is a front elevational view of the instruction aid of the present invention built into a keyboard instrument;

FIGURE 10 is a fragmentary side elevational view illustrating the manner in which the built-in instruction aid is associated with the components of the piano;

Figure 4:
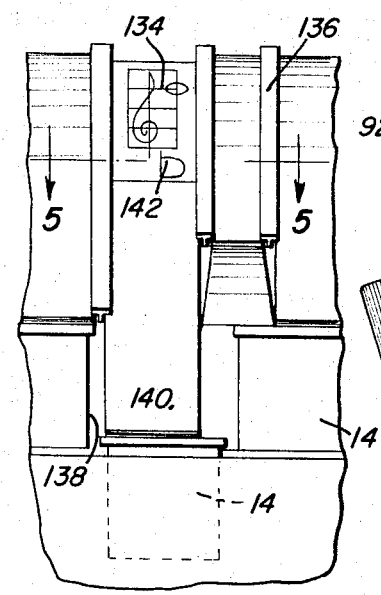
FIGURE 4 is an enlarged fragmentary view of the transition member orientated immediately above the board and illustrating the construction of the movable shutters which have the lower end resting on the individual keys of the keyboard.
Figure 5:
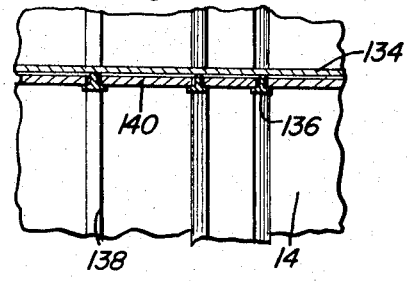
FIGURE 5 is a detailed sectional view taken substantially upon a plane passing along section line 5—5 of FIGURE 4 illustrating the guide structure for the movable shutters.

Referring now specifically to the drawings, the numeral 10 generally designates the instruction aid of the present invention which is mounted on a keyboard instrument such as a piano 12 or the like having the usual depressible white keys 14 and black keys 16 and also a supporting surface 18 orientated at an elevated position above the keyboard. The music rack is normally supported on this surface but rearwardly of the forward edge thereof and the instruction aid 10 of the present invention is adapted to be orientated immediately forwardly of the existing music rack and orientated so that a portion of the instruction aid extends downwardly to a position immediately adjacent the upper surface of the keys 14 and 16.

The instruction aid 10 includes an elongated bottom frame member 20 which may be of any suitable construction but is preferably of hollow configuration for lightness and rigidity. Extending upwardly from the bottom frame 20 is a pair of end frame members 22 and 24 which also may be of any suitable configuration but for purposes of maintaining the device relatively light, the frame members 22 and 23 are formed by double thickness strap having a loop 26 around the bottom frame member 20 and being secured in place by suitable fasteners, rivets or the like. The configuration and construction of the frame members may vary with it being only necessary to have a longitudinally extending rigid member and a pair of end frame members.

Attached to the end areas of the bottom frame member 20 is a pair of supporting legs 28 which extend rearwardly from the bottom frame member 20 and also downwardly therefrom in an inclined direction with the legs 28 terminating in a cushion foot or pad 30 for engaging the surface of the piano without marring said surface. The legs 28 are secured to the bottom frame member 20 by virtue of a wing bolt 32 or the like thus enabling the leg 28 to be adjusted in a horizontal plane direction about the action of the wing bolt 32 thereby enabling the legs 28 to be angularly orientated in any desired association so that the instruction aid of the present invention may be orientated with various types of pianos having the music rack in various orientations thereby facilitating the installation of the instruction aid. This also enables the instruction aid to be orientated in any desired relationship along the length of the piano keyboard depending upon the part of the keyboard to be employed with a particular musical arrangement.

The two legs 28 form two points of support for the bottom frame member 20 and the frame members 22 and 24 and these two points of support are disposed rearwardly of the instruction aid. For supporting the forward end or portion of the instruction aid, a novel structure is provided including a pair of vertically adjustable straps or bars 34 adjustably mounted in sleeves or loops 36 by virtue of frictional engagement therewith. The loops 36 are pivotally mounted by virtue of a pivot bolt 38 to a projecting stud 40 that is fixedly secured to the bottom frame rail 20 just inwardly of each of the end frame members 22 and 24. This construction enables the pivot bolt 38 to be loosened for adjustment of the supporting strap 34 about a transverse axis defined by the pivot bolt 38 and also enables vertical adjustment of the straps 34 depending upon the vertical distance between the keyboard and the surface 18 on which the instruction aid is orientated. Once the straps 34 have been adjusted, they may be locked in both their longitudinally adjusted position and their angularly adjusted position by tightening the pivot bolt 38 with a suitable implement.

Journalled between the lower ends of the straps 34 is a lower roller 42 journalled on axle pins or stub shafts 44 carried by the straps 34. Interconnecting the lower end of the straps 34 below the roller 42 is a bottom strap 45. Thus, the two straps 34 and the bottom strap 45 cooperate to form substantially a U-shaped bail or carrier which supports the lower roller 42 which is an idle roller so that the roller 42 may be orientated both in a vertical direction and in a transverse direction in relation to the piano so that it may be disposed adjacent the front board of the piano structure.

Extending outwardly from each of the straps 34 is a pin 46 having a sleeve 48 adjustably secured thereon by a wing bolt 50. Threaded into the end of the sleeve 48 is a wing bolt 52 which extends through a slot 54 in an elongated fin supporting leg 56 which extends downwardly between adjacent keys 14 and engages the bottom board 58 which underlies the keys 14 in a conventional manner. The sleeve 48 being longitudinally adjustably mounted on the pin 46 by the wing bolt 50 enables the supporting leg 56 to be adjusted a sufficient distance to be orientated so that it can extend downwardly between the keys without interference with the operation of the keys since this space is sufficient to enable a relatively thin supporting leg 56 to project therethrough. The slot 54 received over the wing bolt 52 enables vertical adjustment of the leg 56 so that the two legs 56 thus support the U-shaped bail formed by the straps 34 and 45. While the pin 46 has been illustrated separate from the axle shaft 44, it is within the purview of the invention that this pin be merely an extension of the axle shaft 44 with the roller 42 being journalled on the axle shaft 44 which is stationary. Thus, with the present construction, the two legs 28 and the two legs 56 serve to form four points of support for the instruction aid whereby the instruction aid will be supported on the piano without any direct attachment thereto and it is only necessary to lift the instruction aid upwardly and away from the piano to remove it and it is also relatively simple to assemble with the piano since it is only necessary to pivot the legs 28 to a position that they will not interfere with the music rack on the piano and, if necessary, the supporting legs 56 may be laterally adjusted and vertically adjusted in relation to the piano keyboard. Also, the bail may be vertically and laterally adjusted in relation to the keys for orientating the lower roller 42 in a position adjacent to the keys but also adjacent to the front board of the piano and keep roller 42 from touching the piano.

Journalled between the end frame members 22 and 24 is a take-up roll 60 having relatively large circular flanges 62 on the ends thereof. Mounted on the take-up roll 60 is a leader 64 having a hook or clip 66 thereon which is employed for engaging the lead end 68 of a paper web 70 having a grommet 72 thereon for receiving the hook or clip 66. The paper web 70 is mounted on a supply roll or spool 74 orientated above the take-up roll 60. The paper web is unwound downwardly and from the front of the supply spool 74 between the flanges 62 of the take-up spool 60, downwardly under and rearwardly upwardly around the bottom roller 42 and then over the front of the take-up spool 60 as illustrated clearly in FIGURE 3. The leader 64 on the take-up spool enables the connection of the paper web 70 to the leader 64 at a point disposed forwardly of the bottom roll 42 thereby enabling the take-up roll to be more readily connected with the paper web 70. When the take-up roll or spool 74 is rewound, the paper web 70 will be rewound thereon and the leader attached to the take-up spool 60 will be disposed forwardly of the bottom roller 42.

The supply spool 74 also has flanges 76 thereon and as a socket 78 receiving a stub axle or pin 80 carried by a bearing assembly 82 incorporated into the end frame members 22 and 24. On one side of the supply spool 74, there is provided a spring 84 encircling the shaft or pin 80 and engaging the flange 76 to enable the supply spool with the paper web 70 thereon to be removed from and inserted into the instruction aid in a manner quite similar to the manner in which perforated paper rolls are inserted into a player piano mechanism.

Attached to the end frame 24 is a housing 86 having a bulb 88 therein and receiving an electric motor 90 therein which preferably is of the vibration type having a relatively slow output speed. However, other types of electric motors may be employed but the vibration type motor has been found to be least expensive for this purpose. A rheostat 92 is provided for controlling the output speed of the motor 90 and a convenient on and off switch 94 is also provided. The motor 90 is provided with an output shaft 96 connected with the take-up spool 60 through a clutch assembly 98. Also, there is a drive gear 100 which engages gear 104 connected with the supply spool supporting and driving shaft 80. The gear system 100 and 104 are for reversing the direction of rotation of the supply spool 74 for rewind. When the gear 100 is moved in this manner, the clutch 98 is disengaged thus enabling free wheeling of the take-up spool 64 for rewinding of the paper web 70 onto the supply spool 74 in a known manner.

FIGURE 6 illustrates the details of the clutch mechanism 98 which includes a sleeve 106 on the flange 62 of the take-up roller 60 and a corresponding sleeve 108 on the shaft 96 which is movable laterally for interengaging axially extending lugs and recesses 110 in the sleeves 108 and 106 respectively. The sleeve 108 has the peripheral groove or recess 112 therein which receives a shifting fork 114 having one end thereof pivotally and laterally movable on a pin 116. The other end of the shifting lever or fork 114 is provided with a laterally offset handle 118. The lever 114 extends under the sleeve 108 and is received in the groove 112 and a tension spring 120 extends between the handle end 118 of the lever 114 and in an anchor eye 122 on a supporting bracket 24 which also carries the pin 116 thereby retaining the lever 114 in the groove 112. The aperture in the lever 114 which surrounds the headed pin or shaft 116 is sufficiently large to enable lateral pivotal movement of the lever 114 to disengage the clutch components 108 and 106.

Thus, as the motor is operated, the paper web is wound onto the take-up spool and the indicia thereon will be revealed to the person playing the piano at a point immediately above the piano keys so that there is no chance of error in shifting his view from the instruction paper web to the keys and fingers of his hands. The specific structural details of the mounting of the paper roll as well as the width thereof may be varied as desired with the desired mechanism being capable of manual or electric reverse drive or if a simplified structure is desired, the reverse drive mechanism may be completely eliminated thereby enabling hand rewinding or manual rewinding of the supply spool by virtue of a suitable hand crank or the like on shaft 80.

Figure 3:
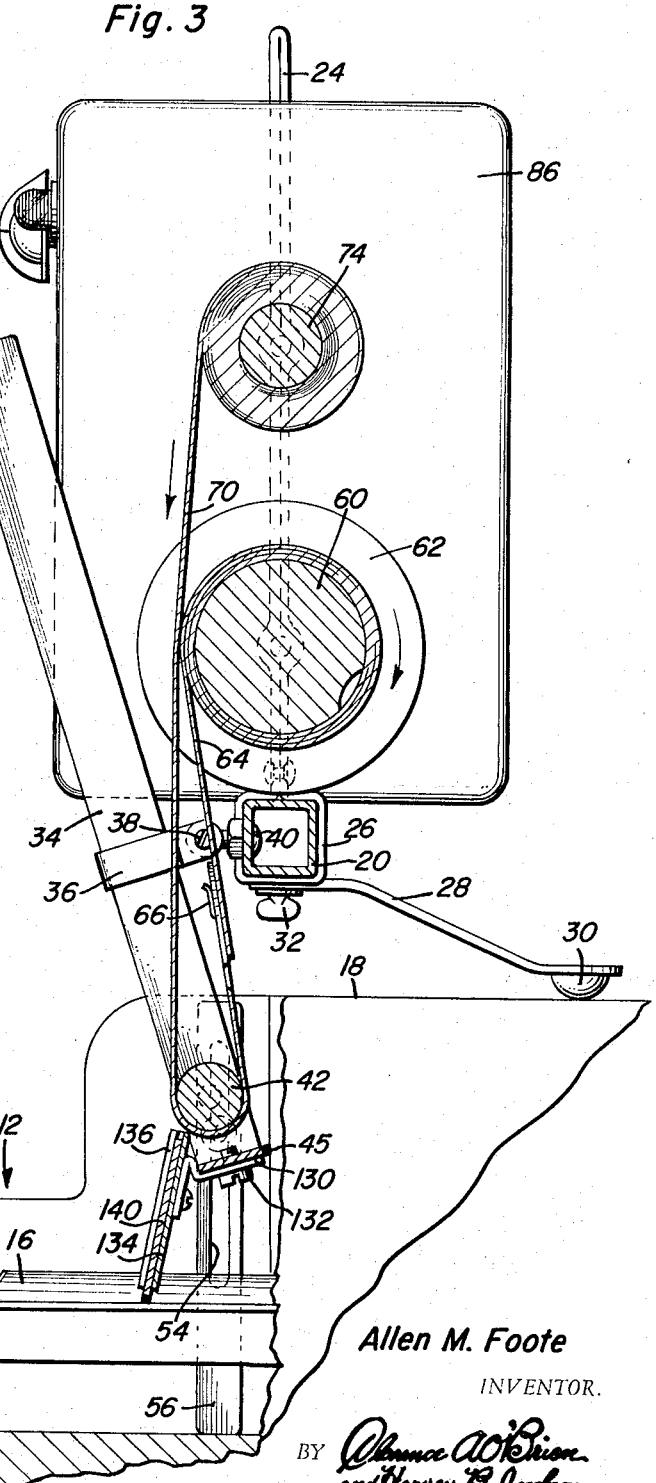
FIGURE 3 is a transverse, vertical sectional view, on an enlarged scale, taken substantially upon a plane passing along section line 3—3 of FIGURE 1 illustrating the structural details of the instruction aid.
Figure 11:
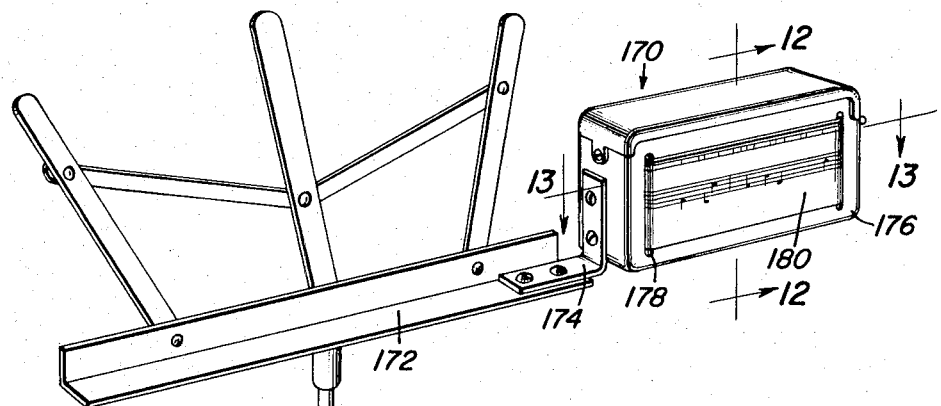
FIGURE 11 is a perspective view of a form of the invention mounted on a music stand.
Figure 12:
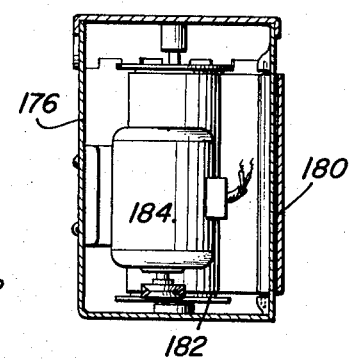
FIGURE 12 is a sectional view along section line 12—12 of FIGURE 11.
Figure 13:
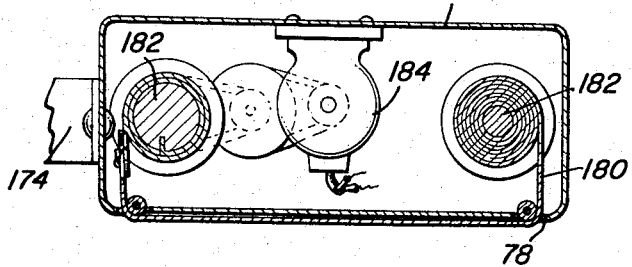
FIGURE 13 is a sectional view along section line 13—13 of FIGURE 11.
Figure 14:
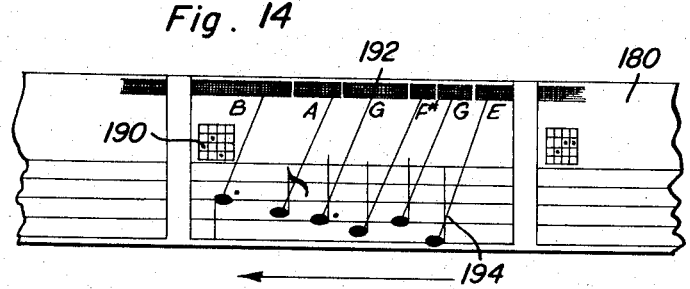
FIGURE 14 is an enlarged face view of a portion of the paper web.

Attached to the bottom strap member 45 is a pair of brackets 130 secured thereto by suitable fasteners 132 adjacent each end of the U-shaped bail. The brackets 132 are secured to an elongated transition bar or plate 134 which is inclined slightly forwardly and extends downwardly to a point immediately adjacent the upper edge surfaces of the keys 14 and 16 and the plate 134 is notched in a manner to fit over the black keys 16 so that the lower edge thereof is adjacent the upper surface of the keys. Disposed on the front surface of the plate 134 is a plurality of T-shaped guides 136 in alignment with the spaces 138 between the keys 14 and 16 and slidable between the T-shaped guides 136 is a plurality of shutters or cover plates 140 which slide downwardly due to gravity when a key 14 is depressed. The shutter 140 will also slide upwardly when the key is released due to the return action of the key. The shutter 140 is rather light and the angle of inclination is not sufficient to cause binding in the guides formed by the T-shaped guide elements 136. Thus, the shutters 140 serve as a continuation of the plate 134 and as illustrated in FIGURE 3, the upper end of the plate 134 is closely adjacent and in alignment tangentially with the roller 42 so that the paper web 70 merges generally into the plate 134 insofar as viewing the paper web is concerned. Thus, the shutters and the spaces between the T-shaped guides 136 serve as extensions of the paper web so that the indicia on the paper web 70 will be easily associated with the keys 14 and 16 regardless of the manner of the angle of viewing of the paper web. Printed on the plate 134 is indicia such as a letter 142 designating the note associated with the particular key together with other indicia simulating sheet music for indicating the particular note or key involved. As illustrated, the base or treble clef is illustrated along with the signature, scale and note.

FIGURES 9 and 10 illustrate an arrangement in which there is a built-in instruction aid 150 incorporated into a piano 152 of usual construction in which there is provided a thin slot 154 along the length of the front board and below a top slot 156 with the slot 154 admitting the paper web 158 through it to the lowermost roller 160. In this construction, suitable brackets are provided for supporting the supply spool 162 and the take-up spool 164 and the supply spool may be removed in a convenient manner. Any suitable electric motor drive may be provided and a top board 166 may be movably supported on the piano by track guides 168 or by any other mechanism whereby the top board 166 may be moved to reveal the supporting structure for the supply spool 162 for enabling the supply spool to be removed and replaced and threaded over top roller and onto the leader. This construction operates in the same manner as in the form of the invention illustrated in FIGURES 1–8 and if desired, indicator lines may be provided for the indicia on the paper web 158 which indicator lines or division lines would run down to the juncture between the keys thereby eliminating parallax. The structure may be supported in such a manner that it can be moved longitudinally of the piano to be associated with any group of keys desired depending upon the music arrangement or musical key signature desired. The paper web and the related structure may only be of a width extending for a portion of the length of the keyboard or may be of a width extending throughout the length of the keyboard as desired.

The indicia on the paper web 70 as well as on the paper web 158 would include marks 170 in the form of rectangular blocks which may be of a solid color with one color block indicating the operation of the keys by the right hand and the other color blocks indicating operation of the keys by the left hand. For example, the right hand blocks could be black or dark blue whereas the left hand blocks could be red or some other distinguishable color. If desired, arrow directional indicia 172 may be provided for indicating the direction in which the next key to be depressed is located. Also, each block 170 will have numerical indicia 174 associated therewith for indicating the finger of the particular hand which is to be used to actuate the particular key involved. As illustrated in FIGURE 1, the blocks 170 are delineated by peripheral lines which will come within the division line or guides 136 on the plate 134 and be alinged with the shutters thereby arranging the structure so that parallax is avoided regardless of the angle of viewing of the paper web. As each block approaches the top edge of the plate 134, the particular key indicated will be depressed and the length of the blocks will indicate the length of each not inasmuch as their length will be proportional to the speed of movement of the paper web in such a manner that this will give an accurate indication of the time for each note.

From the foregoing, it will be appreciated that the significant features of the invention relates the instructional indicia intimately with the keys and actually guides the fingers on the keys. The bar or plate assembly which eliminates the parallax avoids error at the edges of the web and the structure of the attachment eliminates any modification whatsoever of the existing piano while the built-in arrangement would not materially increase the cost or materially alter the basic structure of the piano. The leader on the take-up rolls serve to facilitate connection of the supply roll therewith and the supporting legs which extend down between the keys do not effect the operation of the keys and are adjustable in such a manner to adapt the device to any piano or other musical implement. While the device has been particularly related to pianos, organs and other musical implements, it is pointed out that the same instructional device could be used with any keyboard instrumentality without departing from the present invention and various instructional indicia related to the keyboard could be incorporated into the paper web without departing from the spirit of the invention.

FIGURES 11–14 disclose an instruction aid 170 attached to a conventional music stand 172 and including a bracket 174 attached to the stand and to a hollow housing 176. The housing 176 has a pair of slots 178 in the front face thereof which receives the paper web 180 wound onto rollers 182 journalled in housing 176 with one of the rollers 182 being driven by motor 184 which causes the web to traverse across the outer surface of the housing 176 between the slot 178 thereby revealing the outer surface of the web 180 to a person playing a fretted instrument 186 such as a guitar, banjo or the like. The housing 176 may have a removable lid or cover 188 in which one end of the rollers are journalled so that the rollers may be replaced for changing the particular paper web so that different songs or musical arrangements may be illustrated thereby.

The paper web 180 includes indicia 190 thereon illustrating the position of the fingers on the fretted instrument and also indicia in the form of the blocks 192 along the top edge of the paper web depicts the length of the note. Also, a music scale 194 is depicted which is clearly visible to the player or user and the paper web may have other indicia significant thereto.

In this form of the invention, the paper web traversed horizontally from right to left which is the same direction which normally is employed for reading sheet music. Also, any suitable drive mechanism may be employed and a reverse mechanism may be employed if desired in which event either or both of the rollers may be driven. For example, the rollers may be selectively driven if desired for reversing the paper web for rewind thereof.

In all forms of the invention, the control therefore may be manually operated by a switch on the housing or framework or there may be a foot control switch or a knee control switch which may turn the apparatus on and off, position it in a neutral position, rewind it or control the speed thereof. Also, the reverse mechanism in each instance may be manually operated as illustrated or it may be electrically operated with a suitable solenoid or the like being employed for reversing direction of movement of the rollers. This is especially desirable when having the knee or foot control.

Thus, the device may be controlled as to on and off, direction of rotation, and the speed of rotation by either a hand, foot or knee switch mechanism.

The structure for the piano or keyboard instrument may be moved longitudinally or horizontally in relation to the keyboard for changing the key. Also, on organs which have stops overlying the keyboard, the transition board or member may be pivotally mounted or movably mounted so that the stops may be initially set if desired. While one type of shutter arrangement has been employed for the black and white keys, there is also a simplified arrangement which could be employed such as shutters which are pasted onto the keys and move therewith for revealing and concealing indicia on the transition board. Also, the take-up roller may be provided with a recess therein to eliminate the hump that is provided on the wound-up roll due to the hook on the leader. Also, the leader enables the orientation of the supply roll in a concealed relation inasmuch as the supply spools do not have to be contacted when changing the paper web. Also, the bottom frame members 45 may have a bumper of resilient material or the like thereon for preventing damage to the front board of the piano.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An instruction aid for instruments having keyboards with a plurality of depressible keys orientated therein comprising a framework adapted to be supported from the instrument, a supply roll carried by the framework, a take-up roll carried by the framework, an idler roller carried by the framework, a web of paper movable over the idler roller and wound onto and off of the supply roll and take-up roll, means for rotating said rolls for moving the paper web, said idler roll being adjustably supported from the framework for orientation immediately above and adjacent the inner ends of the keys on the keyboard for guiding the paper web to a point adjacent the keys and indicia on the paper web for indicating which key to depress at a particular time whereby such indicia will be orientated immediately adjacent the keys for enabling easy depression of the key.

2. The structure as defined in claim 1 wherein a transition plate is provided between the idler roller and the keys on the keyboard with the transition plate being substantially tangential to the idler roller and including division marks for indicating separation of the keys.

3. The structure as defined in claim 2 together with a movable shutter mounted on the transition plate for each of the keys and engageable with the top surface of the keys whereby the shutter is movable vertically when the keys are depressed and released, and indicia on the transition plate underlying the shutters to be revealed when the shutter is moved vertically downwardly in response to depression of the keys.

4. The structure as defined in claim 1 wherein said framework is provided with a pair of legs extending rearwardly therefrom and adjustable about vertical axes for orientation of the supporting legs in a desired angular orientation in relation to the framework.

5. The structure as defined in claim 4 wherein said idler roller is mounted on a substantially U-shaped bail being vertically and pivotally attached to said framework for adjustment of the idler roller in relation to the keyboard.

6. The structure as defined in claim 5 wherein a pair of vertically adjustable legs are attached to said bail, said legs being quite thin in construction and vertically adjustable for insertion between the keys of the keyboard thereby enabling the supporting leg to engage an underlying board below the keyboard.

7. The structure as defined in claim 6 together with a transition board supported from the U-shaped bail, said transition plate including division indicating members for indicating the keys of the keyboard, said paper web including elongated marks thereon for alignment with the division lines thereby eliminating parallax when viewing the paper web at an angle.

8. The structure as defined in claim 1 wherein said take-up roll is provided with a leader having means thereon for detachable engagement with the free end of the paper web thereby facilitating the connection of the paper web with the take-up roll.

9. The structure as defined in claim 1 wherein said means for driving the rolls includes a variable speed motor together with a control therefor for varying the linear speed of the paper web.

10. An instruction aid for instruments having keyboards including a plurality of depressible keys comprising a frame supported above the keyboard, a web carried by said frame and having indicia thereon for positioning adjacent the keyboard for indicating keys to be depressed, means on said frame for unreeling and reeling said web at a selected linear speed, and means adjusting the orientation of the web in relation to the keyboard, a transition member positioned between the upper surface of the keys on the keyboard and the web and including delineated areas thereon forming continuations of the indicia on the web, said transition member including a plurality of movable panels engaged with the keys, each movable panel being moved by gravity when the key is depressed and being returned to a normal position when the key is released due to movement of the key to its normal position, and indicia on said transition member normally concealed by a movable panel but being revealed when the key is depressed thus designating the depressed key.

11. The structure defined in claim 10 wherein said means for adjusting the web includes an idler roller over which the web is entrained, bracket means supporting the idler roller in adjusted position in relation to the keyboard adjacent the supported ends of the keys.

(References on following page)

References Cited

UNITED STATES PATENTS

| | | | |
|---|---|---|---|
| 210,888 | 12/1878 | Woods | 84—483 |
| 347,686 | 8/1886 | Carpenter et al. | 84—478 |
| 855,636 | 6/1907 | Howell | 84—483 |
| 877,259 | 1/1908 | Thrash | 84—485 X |
| 1,515,403 | 11/1924 | Ohlsen | 84—483 |
| 1,544,426 | 6/1925 | Blum | 84—483 |
| 1,838,284 | 12/1931 | Refsgaard | 84—483 |
| 2,254,547 | 9/1941 | Rupp | 84—485 |
| 2,543,471 | 2/1951 | Scholl | 84—482 X |

FOREIGN PATENTS 374,189   6/1932   Great Britain.

RICHARD B. WILKINSON, *Primary Examiner.*

CHARLES M. OVERBEY, *Assistant Examiner.*